No. 767,192. PATENTED AUG. 9, 1904.
H. C. WILLIAMS.
AUTOMATIC LOADING DEVICE.
APPLICATION FILED APR. 15, 1904.
NO MODEL.
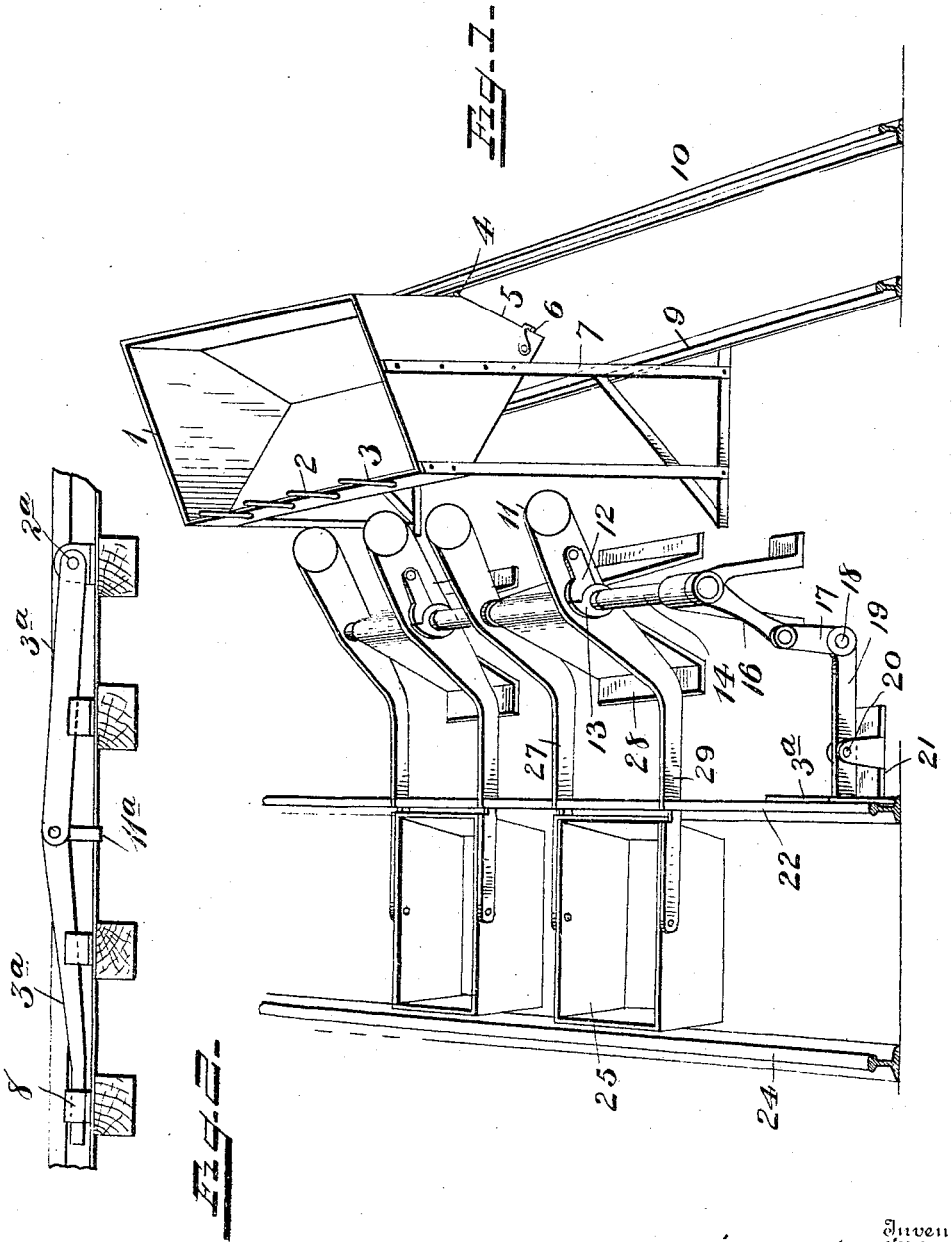
Witnesses:
W. H. Durand.
J. H. Pfister.
Inventor:
Hiram C. Williams,
By Laws Baggy & Co.
Attorneys.

No. 767,192. Patented August 9, 1904.

UNITED STATES PATENT OFFICE.

HIRAM C. WILLIAMS, OF JERSEY SHORE, PENNSYLVANIA, ASSIGNOR OF ONE-HALF TO RANDALL B. HAYES, OF JERSEY SHORE, PENNSYLVANIA.

AUTOMATIC LOADING DEVICE.

SPECIFICATION forming part of Letters Patent No. 767,192, dated August 9, 1904.

Application filed April 15, 1904. Serial No. 203,349. (No model.)

*To all whom it may concern:*

Be it known that I, HIRAM C. WILLIAMS, a citizen of the United States, residing at Jersey Shore, in the county of Lycoming and State of Pennsylvania, have invented new and useful Improvements in Automatic Loading Devices, of which the following is a specification.

My invention relates to improvements in means or contrivances especially designed for loading material—such as sand, coal-ashes, &c.—into a storage-receptacle or into cars or otherwise disposing of said material.

The object of said invention is principally to effect the foregoing automatically and expeditiously and in an effective manner, while other advantages and benefits of said invention will be noted from the following description.

Said invention consists of sundry combinations and arrangements of parts, including their construction, in a restricted degree, substantially as hereinafter fully disclosed, and particularly pointed out by the claims.

In the accompanying drawings, illustrating the preferred embodiment of my invention, Figure 1 is a perspective view thereof. Fig. 2 is a broken-away detailed view disclosing more fully the engine-actuated lever mechanism for effecting the operation of certain other parts.

In the carrying out of my invention I employ, preferably, a number or plurality of receptacles or pans 25, the same in the present case or illustration being shown arranged between railway-rails 22 and 24, as for "roundhouse" purposes, as will more fully appear later. Levers 27 29, preferably angular or bent and pivoting upon a common crank-rod or shaft 14, suitably supported in position upon bearings 28, carry or have pivoted to the ends of their longer arms said pans or receptacles 25, a pair or two levers being secured together and connected laterally to each of the latter about at its mid-length, whereby as the levers are moved upon their fulcrum said pans or receptacles will always maintain a horizontal position until tilted by other means, as presently explained. Each of a pair of these levers is equipped laterally with a dog or latch 12, adapted to engage a lug or cam 13, preferably integral or in one with a collar held fast to the shaft or crank-rod 14, preferably by a set or holding screw. (Not shown.) Said levers have their shorter arms weighted, as at 11, to counterbalance or offset the weight of said pans or receptacles to prevent, as would otherwise be the case, the sudden downward precipitation or thrust of the latter in their return movement, as after having been emptied.

A suitable bin or hopper 1, supported in an elevated position in any well-known way, as by the braced uprights or supports 7, alongside of a railway 9 10, is provided with upstanding fingers or bars 2 3, serving to trip the pans 25 as the pans or receptacles 25 reach their dumping position, as in delivering their contents into said bin. Said bin or hopper has suitably-hinged bottoms 5 latched into closed position, as at 6, for the discharge of the material therein contained, as hereinafter disclosed.

Alongside of the railway-track 22 24 beyond the pans or receptacles 25 are arranged toggle-levers $3^a$, with one end of one lever pivoted as at $2^a$, while the free end of the other lever is controlled in its flexures or movement by a keeper or housing 8. Centrally said toggle-levers stand in a plane above the surface of said railway-rails, so as to be engaged and depressed by the truck-wheels of the engine or car for the actuation of said levers, the purpose and effect of which will be apparent presently.

Secured to the rock-shaft or fulcrum 14 at one end is a crank-arm 16, linked, as at 17, to a lever 19, suitably fulcrumed, as at 20 21, one end of said lever being connected to a pendant or stirrup $11^a$, depending from said toggle-levers about at their pivotally-connected-together ends or their upward-flexed portions, said lever normally occupying a horizontal position when said toggle-levers are in such upward-flexed position. Therefore it will be noted that when an engine, for instance, has passed upon the railway-rails 22 and 24, so as to permit its ash-chamber to come opposite any one of the receptacles or pans 25, and the ashes of said chamber have been discharged thereinto, and as the engine is moved farther along said rails thereafter, so that its wheels shall engage and depress the upward-flexed portions of said toggle-levers, at which time the engine will have passed from over said pans, the lever 19 will be so actuated as to move the crank-arm 16 upward and rearward correspondingly rotating or turning the shaft 14. The effect of this action is to cause the cam 13 in engagement with said shaft to engage the corresponding latch or dog 12 of one of the levers 27 29, carrying the latter upward and forward into such position as to effect engagement therebetween, and the opposite trip or bar effecting the tripping of the pan and the discharging of its contents into the bin or hopper 1, which may be relieved of its contents by suitably opening its hinged bottoms and permitting the dropping of said contents into a car which may be run under the same, as is apparent. After such tripping of parts and the discharging of said pan the latter, with its carrying-levers, will be returned to its initial position, it is obvious, by gravity as the engine-wheel passes out of contact with the upward-flexed portions of the toggle-levers.

Latitude is allowed as to details herein as circumstances may suggest without departing from the spirit of my invention.

I claim—

1. A device of the character described, employing a lever having suspended from one end a receptacle, a shaft or fulcrum for said lever, means arranged upon said shaft and lever adapted to effect connection therebetween, means adapted to actuate said shaft and means arranged to be operated alongside a railway-track and to operate said shaft-actuating means.

2. A device of the character described, employing a lever having suspended from one end a receptacle, a shaft or fulcrum for said lever, having a lug or cam said lever having a latch or dog adapted to engage said cam or lug, means adapted to actuate said shaft, and means arranged to be operated alongside a railway-track and to operate said shaft-actuating means.

3. A device of the character described, employing a lever having suspended from one end a receptacle and having its opposite end weighted or counterbalanced, a shaft for fulcruming said lever and having a cam or lug thereon, said lever having pivoted thereto a latch or dog adapted to engage said lug or cam, means for actuating said shaft, and means arranged to be operated alongside a railway-track, and to operate said shaft-actuating means.

4. A device of the character described employing a lever having suspended from one end a receptacle, a shaft or fulcrum for said lever, means for effecting connection between said lever and shaft, and means arranged to be operated alongside a railway-track having connection with a lever linked to a crank-arm of said shaft.

5. A device of the character described, employing a lever having suspended from one end a receptacle, a shaft or fulcrum for said lever, means effecting connection between shaft and lever, means for actuating said shaft, means arranged to be operated alongside a railway-track and operate said shaft-actuating means, and means for tripping said receptacle as it reaches its dumping position.

6. A device of the character described, employing a pair of connected levers having suspended between their outer ends a receptacle, a shaft forming a fulcrum for said levers, means effecting connection between one of said levers and shaft, means arranged to be operated alongside a railway-track, embracing toggle-levers with their upward-flexed portions arranged in a plane above the surface of the rails of said track, and adapted to operate said shaft-actuating means.

In testimony whereof I have signed my name to this specification in the presence of two subscribing witnesses.

HIRAM C. WILLIAMS.

Witnesses:
J. M. COOPER,
JOHN T. HYATT.